United States Patent [19]
Maveddat et al.

[11] Patent Number: 6,129,604
[45] Date of Patent: Oct. 10, 2000

[54] DYNAMIC LOAD DISTRIBUTION IN A WIRELESS COMMUNICATION SYSTEM TO EQUALIZE LOADING ON MOBILE SWITCHING CENTERS

[75] Inventors: Payam Maveddat; Will Egner; Wei Yuan, all of Plano, Tex.

[73] Assignee: Nortel Networks Limited, Montreal, Canada

[21] Appl. No.: 09/032,504

[22] Filed: Feb. 26, 1998

[51] Int. Cl.$^7$ .............................. H04Q 7/20; H04Q 7/38; H04Q 5/00
[52] U.S. Cl. .................. 445/453; 445/453; 445/432; 445/436; 445/560
[58] Field of Search .................. 455/432, 433, 455/436, 443, 445, 456, 560, 453

[56] References Cited

U.S. PATENT DOCUMENTS

| | | | |
|---|---|---|---|
| 4,670,899 | 6/1987 | Brody et al. | 455/453 |
| 4,974,256 | 6/1989 | Cyr et al. | 455/453 |
| 5,504,935 | 4/1996 | Vercauteren | 455/33.2 |
| 5,577,029 | 5/1995 | Lu et al. | 455/445 |
| 5,754,959 | 5/1998 | Ueno et al. | 455/453 |
| 6,041,239 | 5/1995 | Reed et al. | 455/453 |

*Primary Examiner*—Thanh Cong Le
*Assistant Examiner*—Meless Zewdu N.
*Attorney, Agent, or Firm*—Bruce E. Garlick; James A. Harrison

[57] ABSTRACT

A wireless communication system includes a plurality of base stations, a plurality of base station controllers and a plurality of mobile switching centers. The plurality of base stations each support wireless communications within a respective cell and service load therein relating to subscribing units operating therein. Each of the base station controllers couples to a plurality of base stations and each of the mobile switching centers couples to at least one base station controller. The plurality of base station controllers and the plurality of mobile switching centers are managed to dynamically route load between the base station controllers and the mobile switching centers in an effort to equalize load on the plurality of mobile switching centers. At least one base station controller of the plurality of base station controllers may route its load to a first mobile switching center during a first period and route its load to the second mobile switching center during a second period. The first period and the second period may correspond to differing time periods and/or differing days. Such periods may be determined based upon historical loadings of the wireless communication system and simulation results. However, in other operations, the load is switched based upon actual system loading and the periods are determined according to the actual system loading. In other operations of the wireless communication system, a base station controller routes its load concurrently to both a first mobile switching center and a second mobile switching center of the plurality of mobile switching centers. In such operations, a first amount of load is routed to the first mobile switching center and a second amount of load routed to the second mobile switching center, such levels determined based upon loading of at least one of the first mobile switching center and the second mobile switching center.

37 Claims, 9 Drawing Sheets

DYNAMIC LOAD DISTRIBUTION IN A WIRELESS COMMUNICATION SYSTEM TO EQUALIZE LOADING ON MOBILE SWITCHING CENTERS

BACKGROUND

1. Technical Field

The invention relates generally to wireless communication systems; and more particularly to a system and associated of operation for distributing load among mobile switching centers supporting a wireless network.

2. Related art

Wireless communication systems are generally known in the art to service wireless communications within a service area. The construction of a wireless communication system typically includes a plurality of base stations dispersed throughout the service area. The base stations couple to base station controllers, with each base station controller serving a plurality of base stations. Each base station controller couples to a mobile switching center that also couples to the public switched telephone network and to other mobile switching centers. Mobile units operating within the wireless communication system establish communication with one or more of the base stations. The structure of the wireless communication system is hierarchical such that the load served by the base stations routes through a predetermined path via a designated base station controller to a designated mobile switching center.

When the resources of the wireless communication system are insufficient to service load in a particular area, not all requested calls will be serviced. The capacity shortfall causes calls to be dropped, calls to be blocked and degrades system performance. Failing to service customers results in the loss of customers as well as a reduction in the revenue that would otherwise be generated by servicing the calls. Thus, it is extremely important to support as many calls as possible so that subscribers remain with the service provider and so that revenues are maximized.

When a wireless communication system is first deployed, base stations are located to provide wireless coverage throughout the service area. In a typical installation, each base station will be assigned to a geographic area of an approximately equal size. However, in areas of greater load density, base stations are placed closer to one another than in areas of lesser load density to increase the capacity of the wireless communication system in such areas. Load density depends upon a number of things, including population density, penetration rates, cost of service and various other factors that determine a concentration of subscribers that use their wireless units to service calls at any particular time. Load density may be predicted based upon both simulations and historical load usage patterns.

For example, in a metropolitan area such as the greater Dallas area, load density is greater in the downtown area, particularly during the day. However, in the evening and at night when the people that work downtown commute to the outlying areas, the load density downtown decreases. The inverse effect is seen in the outlying areas surrounding the downtown area. With a large work force located downtown during the day, traffic on the outlying areas is reduced. However, as the work force drives home from the downtown area into the outlying areas, load increases in the outlying areas. Thus, load varies over time not only in the downtown area but in the outlying areas as well.

Unfortunately, the capacity of the installed wireless communication system is fixed over time. Thus, to have a capacity sufficient to service a large number of calls within any portion of the service area during a peak loading period, significant resources must be installed across the service area. Such resources are extremely expensive and, when not fully used to service calls, generate no revenue for the service provider. Thus, in most systems, resources are deployed based upon expected load patterns initially and expansions are made to provide additional capacity to those areas that are overloaded. While such expansions may provide an immediate solution to the problem, the expansions are expensive as well and are only utilized during heaviest loading periods.

Thus, there is a need in the art for a wireless communication system and method of operation that manages resources to provide capacity in those portions of the wireless communication system requiring capacity when needed, but that may reassign the resources to other portions of the wireless communication system when the resources are required elsewhere. Further, there is a need in the art for a method for allocating such resources to optimally load the wireless communication system.

SUMMARY OF THE INVENTION

A wireless communication system constructed according to the present invention overcomes the limitations of the prior systems in balancing loading on mobile switching centers, among other limitations. The wireless communication system includes a plurality of base stations, a plurality of base station controllers and a plurality of mobile switching centers. The plurality of base stations each support wireless communications within a respective cell and service load therein relating to subscribing units operating therein. Each of the base station controllers couples to a plurality of base stations and each of the mobile switching centers couples to at least one base station controller. The plurality of base station controllers and the plurality of mobile switching centers are managed to dynamically route load between the base station controllers and the mobile switching centers in an effort to equalize load on the plurality of mobile switching centers.

In accomplishing such routing of load, at least one base station controller of the plurality of base station controllers may route its load to a first mobile switching center during a first period and route its load to a second mobile switching center during a second period. The first period and the second period may correspond to differing time periods and/or differing days. Such periods may be determined based upon historical loadings of the wireless communication system and/or simulation results. However, in other operations, the load is switched based upon actual system loading and the periods are determined according to the actual system loading.

In other operations of the wireless communication system, a base station controller routes its load concurrently to both a first mobile switching center and a second mobile switching center of the plurality of mobile switching centers. In such operations, a first amount of load is routed to the first mobile switching center and a second amount of load routed to the second mobile switching center, such levels determined based upon loading of at least one of the first mobile switching center and the second mobile switching center. By performing such routing, the mobile switching centers may be equally loaded during all time periods.

To physically perform the routing, different switching configurations may be employed. In a first switching configuration, a switch couples a base station controller of the plurality of base station controllers to both a first mobile switching center and a second mobile switching center of the plurality of mobile switching centers. In one construction, the switch includes a first mobile switching center interface, a second mobile switching center interface, a base station controller interface and processing circuitry. The first mobile switching center interface couples to the first mobile switching center. The second mobile switching center interface couples to the second mobile switching center. The base station controller interface couples to the base station controller. Further, the processing circuitry operates the first mobile switching center interface, the second mobile switching center interface and the base station controller interface to route load between the base station controller interface and the first mobile switching center interface and the second mobile switching center interface.

In another physical configuration that performs the switching, at least one of the plurality of base station controllers includes a first mobile switching center interface and a second mobile switching center interface. The first mobile switching center interface couples the base station controller to a first mobile switching center of the plurality of base station controllers. Additionally, the second mobile switching center interface couples the base station controller to a second mobile switching center of the plurality of base station controllers. Processing circuitry contained within the base station controller then routes load to one or both of the mobile switching center interfaces.

In still another physical configuration, a dedicated network couples each of the plurality of base station controllers to each of the mobile switching centers. In such a construction, load may be dynamically routed from the plurality of base stations to the plurality of mobile switching centers over the dedicated network to substantially equally load the plurality of mobile switching centers. The dedicated network may include a wired network such as an asynchronous transfer mode network that provides sufficient bandwidth to perform all routing among the plurality of base station controllers and the plurality of mobile switching centers.

Moreover, other aspects of the present invention will become apparent with further reference to the drawings and specification which follow.

DETAILED DESCRIPTION OF THE DRAWINGS

Figure 1:
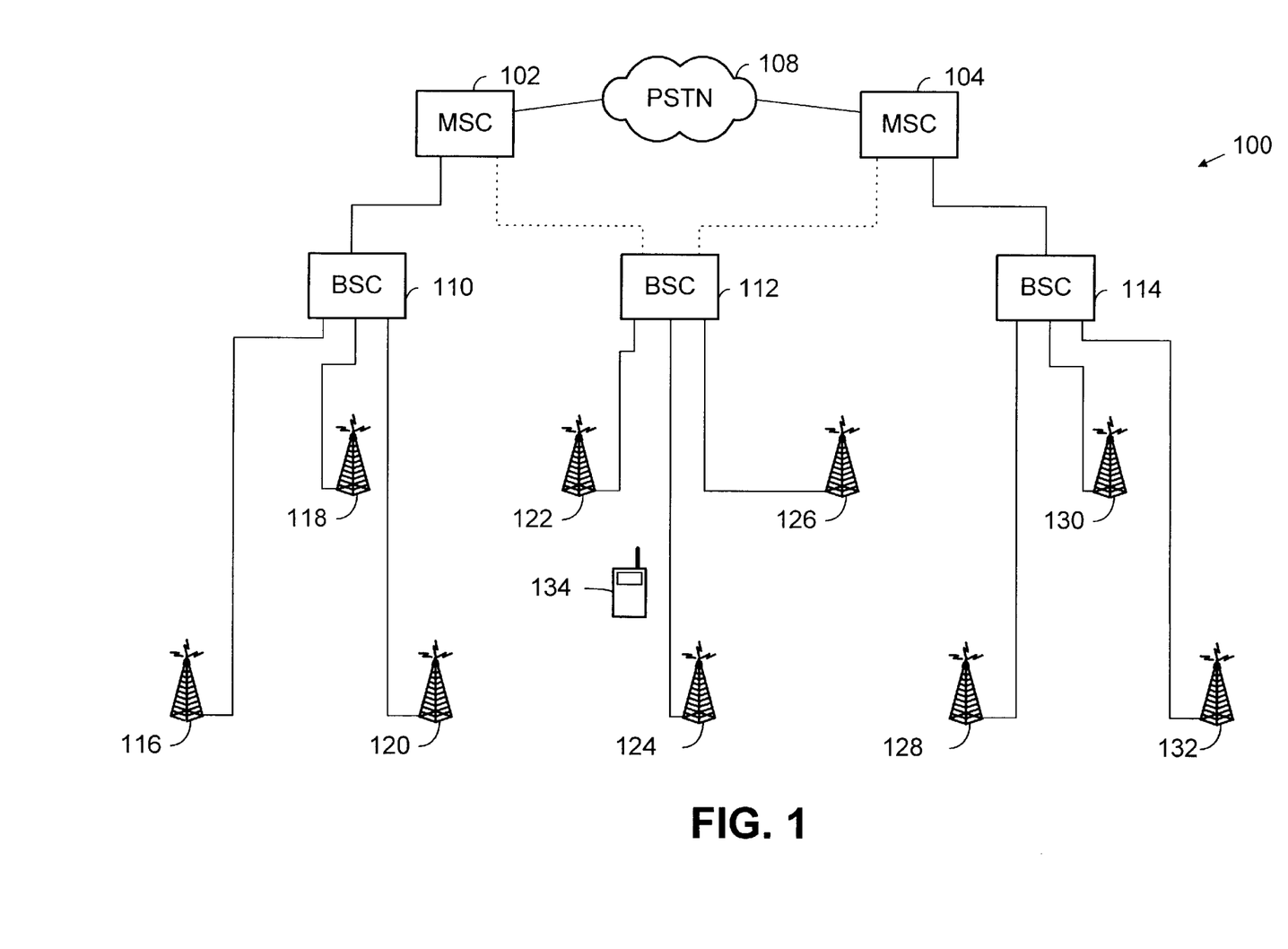
FIG. 1 is a diagram illustrating a wireless communication system constructed according to the present invention.

FIG. 1 illustrates a wireless communication system 100 constructed according to the present invention. The wireless communication system 100 includes mobile switching centers (MSCs) 102 and 104, base station controllers (BSCs) 110, 112, and 114, and base stations 116 through 132. Each of the base stations 116 through 132 includes an antenna mounted upon a tower and a base station transceiving subsystem (BTS). The base stations 116 through 132 will be referred to hereinafter as either BTSs or base stations.

As shown, MSCs 102 and 104 both couple to the public switched telephone network (PSTN) 108. The wireless communication system 100 operates to service calls from a wireless unit 134 to end point devices coupled to the PSTN 108 as well as to service calls between wireless units operating within the service area of the wireless communication system 100.

As is shown, BTSs 116, 118, and 120 are serviced by BSC 110. Further, BTSs 122, 124, and 126 are serviced by BSC 112. Finally, BTSs 128, 130, and 132 are serviced by BSC 114. Thus, all calls serviced by BTSs 116, 118, and 120 are also serviced by BSC 110 and MSC 102 while all calls serviced by BTSs 128, 130, and 132 are also serviced by BSC 114 and MSC 104. However, calls serviced by BTSs 122, 124, and 126 are serviced by BSC 112 but may be serviced either by MSC 102 or 104. Based upon the loading on MSCs 102 and 104, which is of course based upon the loading on BSCs 110, 112, and 114, call traffic is routed either between MSC 102 and BSC 112 or between MSC 104 and BSC 112. By shifting load on BSC 112 between MSC 102 and MSC 104, the loading on MSC 102 and MSC 104 may be equalized.

In an example of operation of the wireless communication system 100, BSC 114 serves a downtown area while BSC 110 serves an outlying area. BSC 112 serves a commuting region between the downtown area served by BSC 114 and the outlying area served by BSC 110. During week day working hours, BSC 114 is heavily loaded while BSC 110 is lightly loaded and BSC 112 is moderately loaded. However, on weekends and on weekday non-working hours, BSC 114 is lightly loaded while BSC 110 is heavily loaded and BSC 112 is moderately loaded.

According to the present invention, in order to equalize loading on the MSCs 102 and 104, during heavy loading periods on BSC 114, MSC 102 serves BSC 110 and BSC 112. However, on the weekends and during non-working hours, when BSC 114 is lightly loaded, MSC 104 serves BSC 112 and BSC 114. In this fashion, system capacity of the wireless communication system 100 is increased and each of the components from the system is utilized in an optimum fashion.

Figure 2A:
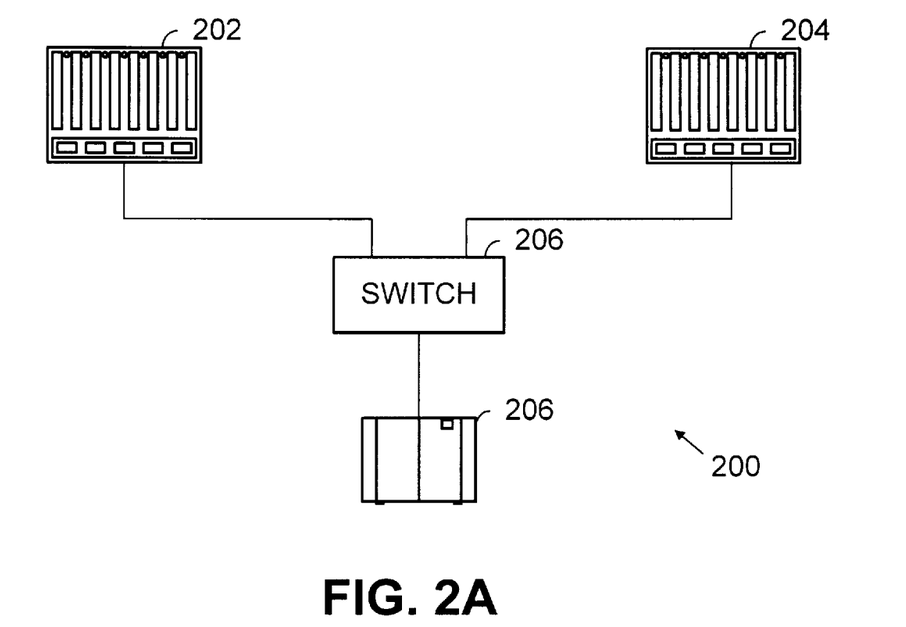
FIGS. 2A and 2B are block diagrams illustrating generally components of the wireless communication system of FIG. 1 in two differing constructions.

FIG. 2A illustrates a particular construction according to the present invention wherein switching is performed external to a coupled BSC and coupled MSCs. In the construction, the wireless communication system includes MSCs 202 and 204 which couple to BSC 208 via a switch 206. By the automatic switching operations performed by the switch 206, BSC 208 views its connection to the MSCs as being transparent. All routing and changeover operations are performed by the switch 206. Thus, the BSC 208 need not be modified as compared to the BSC of a standard implementation. Construction of such a switch 206 will be described further herein with reference to FIG. 5.

Figure 2B:
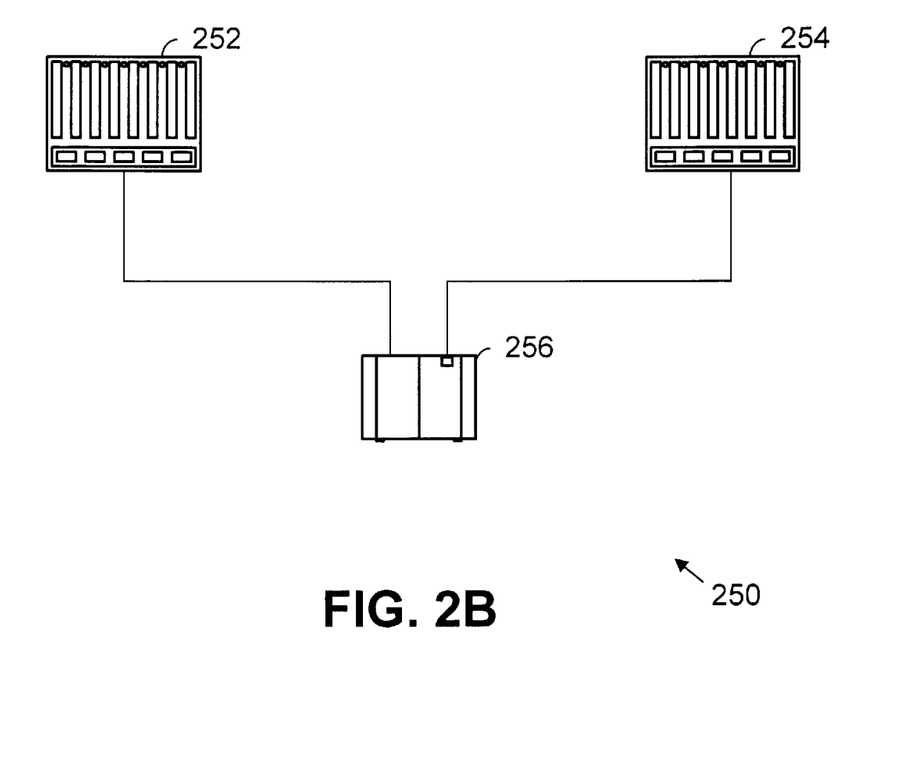

FIG. 2B illustrates an implementation 250 in which switching is performed within a BSC 256 to route traffic to either MSC 252 or MSC 254. In such implementation, modifications to BSC 256 are required to implement the principles of the present invention. Such construction will be described further herein with reference to FIG. 4.

Figure 3:
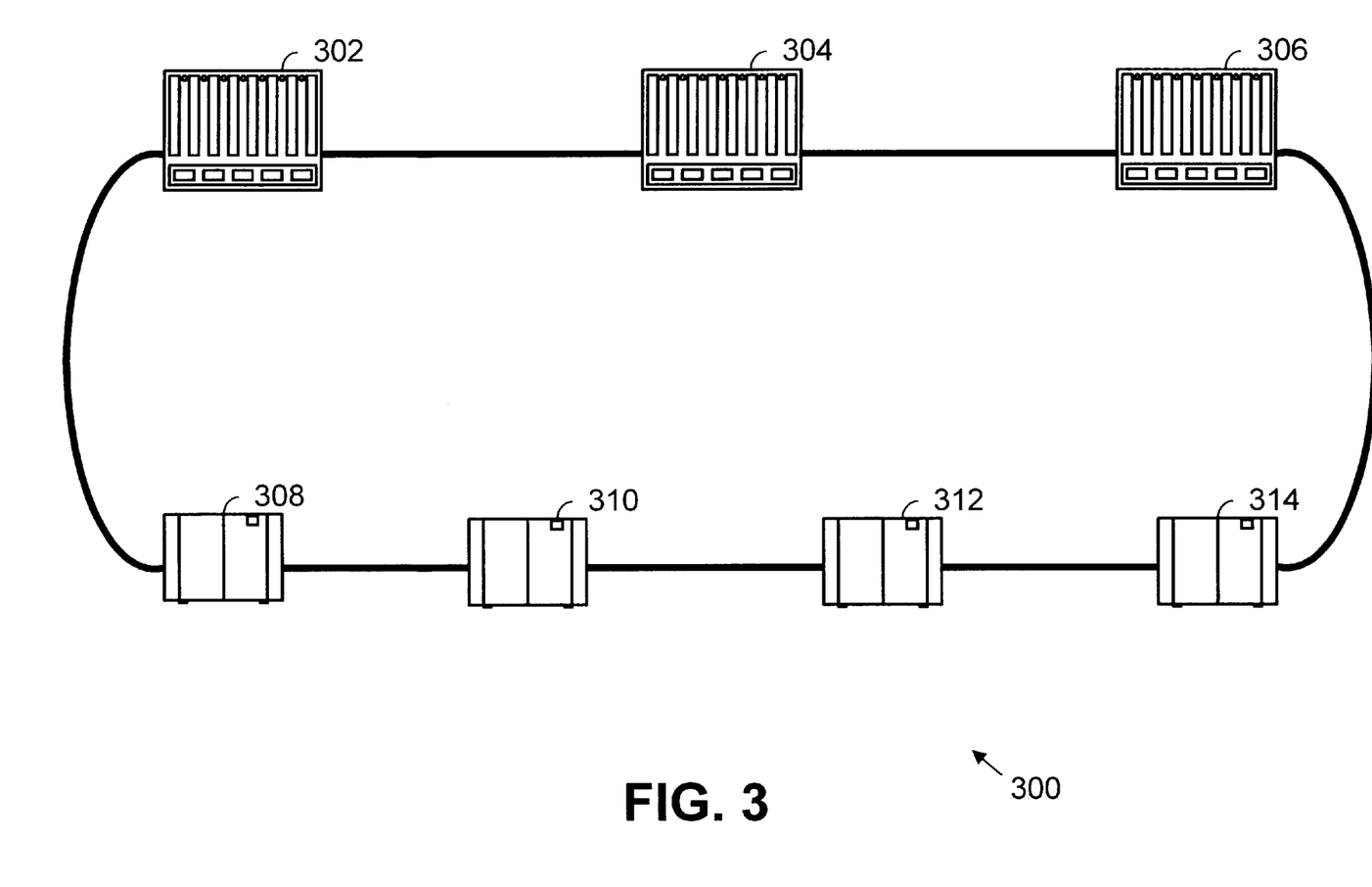
FIG. 3 is a block diagram illustrating another construction of a portion of a wireless communication system constructed according to the present invention.

FIG. 3 illustrates another embodiment of construction of a wireless communication system 300 according to the present invention in which traffic is routed between MSCs 302, 304 and 306 and BSCs 308, 310, 312 and 314. In the construction, the load is routed over a dedicated network 316 having significant bandwidth. The dedicated network 316 may be an ATM network, for example, constructed on a fiber optic link that has much greater bandwidth than could be served by the wireless communication system as a whole. The fiber optic link has sufficient bandwidth to service all calls within the wireless communication system and thus may service all traffic passing between the MSCs 302, 304 and 306 and the BSCs 308 through 314. However, the dedicated network 316 could be constructed as a microwave loop which also has sufficient bandwidth to service all load within the wireless communication system.

Calls may be routed from any of the BSCs 308 through 314 to any of the MSCs 302 through 306 in either direction on the dedicated network. Because of the construction, calls may be routed from any of the BSCs 308–314 to any of the MSCs 302–306. Thus, low cost or preferred routing of calls may be accomplished. In one example of operation, calls originating with a serviced wireless unit are routed to an MSC of the MSCs 302–306 that required minimal PSTN routing so that the cost of the call is minimized. Further, in conjunction with a PSTN intelligent network, calls may be routed from the PSTN to a nearest MSC and from the nearest MSC to a serving BSC. In such case, the cost of the call is also reduced. In still another example of operation, calls are routed to the MSCs 302–306 to avoid bottlenecks in the PSTN or based upon PSTN preferences.

Construction of the wireless communication system 300 is a substantial departure from the hierarchical structure previously described with reference to FIG. 1 and implemented in prior art wireless communication systems. By constructing the wireless communication system in this fashion, full balancing of load may be executed to remove or minimize any limitations that would otherwise be caused by linking BSCs to MSCs.

Figure 4:
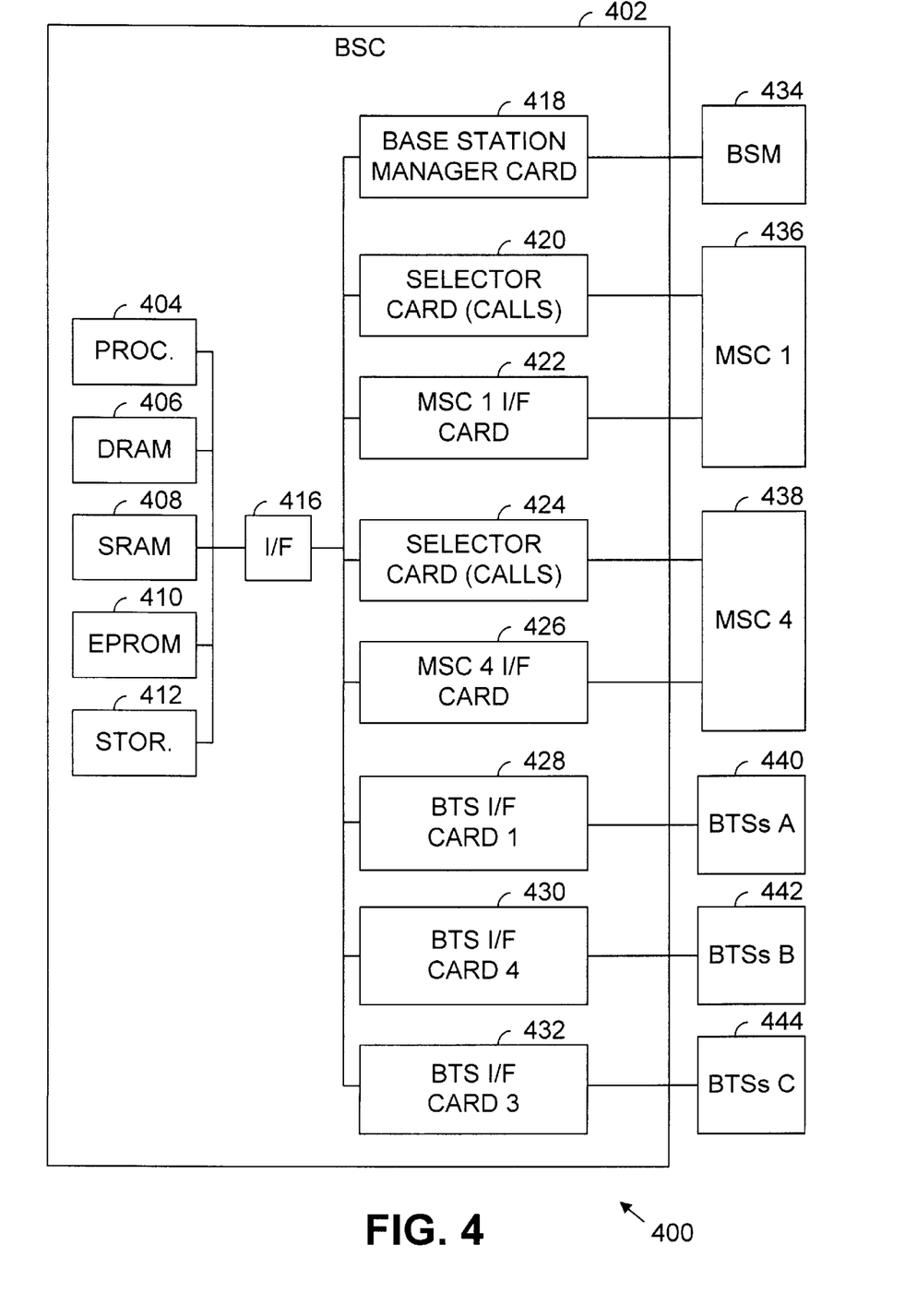
FIG. 4 is a block diagram illustrating a base station controller constructed according to the present invention.

FIG. 4 illustrates a particular construction of a BSC 400 that switches load between two connected MSCs, MSC 1 436 and MSC 2 438. The BSC 400 includes a case 402 within which a plurality of components are installed. Processing and storage components include a processor 404, DRAM 406, SRAM 408, EPROM 410 and bulk storage 412. These components are generally known in the art to perform processing, storage and control functions. The BSC 400 also includes a plurality of interface cards 418–432 that interface to the processor 404, DRAM 406, SRAM 408, EPROM 410 and bulk storage 412 via an interface 416. The cards 418–432 interface the BSC 400 to the other components of the wireless communication system.

A base station manager card 418 couples the BSC 400 to a base station manager 434. A selector card 420 and an MSC interface card 422 couple the BSC 400 to MSC 1 436. Further, a selector card 424 and an MSC interface card 426 couple the BSC to MSC 2 438. BTS interface cards 428, 430, and 432 couple the BSC 400 to connected base station groups 440, 442 and 444, each base station group including a plurality of BTSs.

In routing traffic from the BSC 400 to MSC 1 436 and MSC 2 438, the BSC 400 performs to switch load to MSC 1 436 and MSC 2 438. In switching the load, the BSC 400 may perform dynamic load balancing, time of day switching, and day of week switching or switch the load based upon other criteria. Programmed instructions executed by the components of the BSC 400 cause calls to be routed to MSC 1 436 or MSC 2 438 based upon predetermined thresholds and/or predetermined conditions operations. As will be more fully described herein, the predetermined thresholds may be set based upon historical load, upon simulation results or upon such other factors which would allow a system operator to manage the load served by the BSC 400. Such thresholds and/or predetermined conditions may be altered by altering program instructions executing by the BSC 400 using known techniques.

Figure 5:
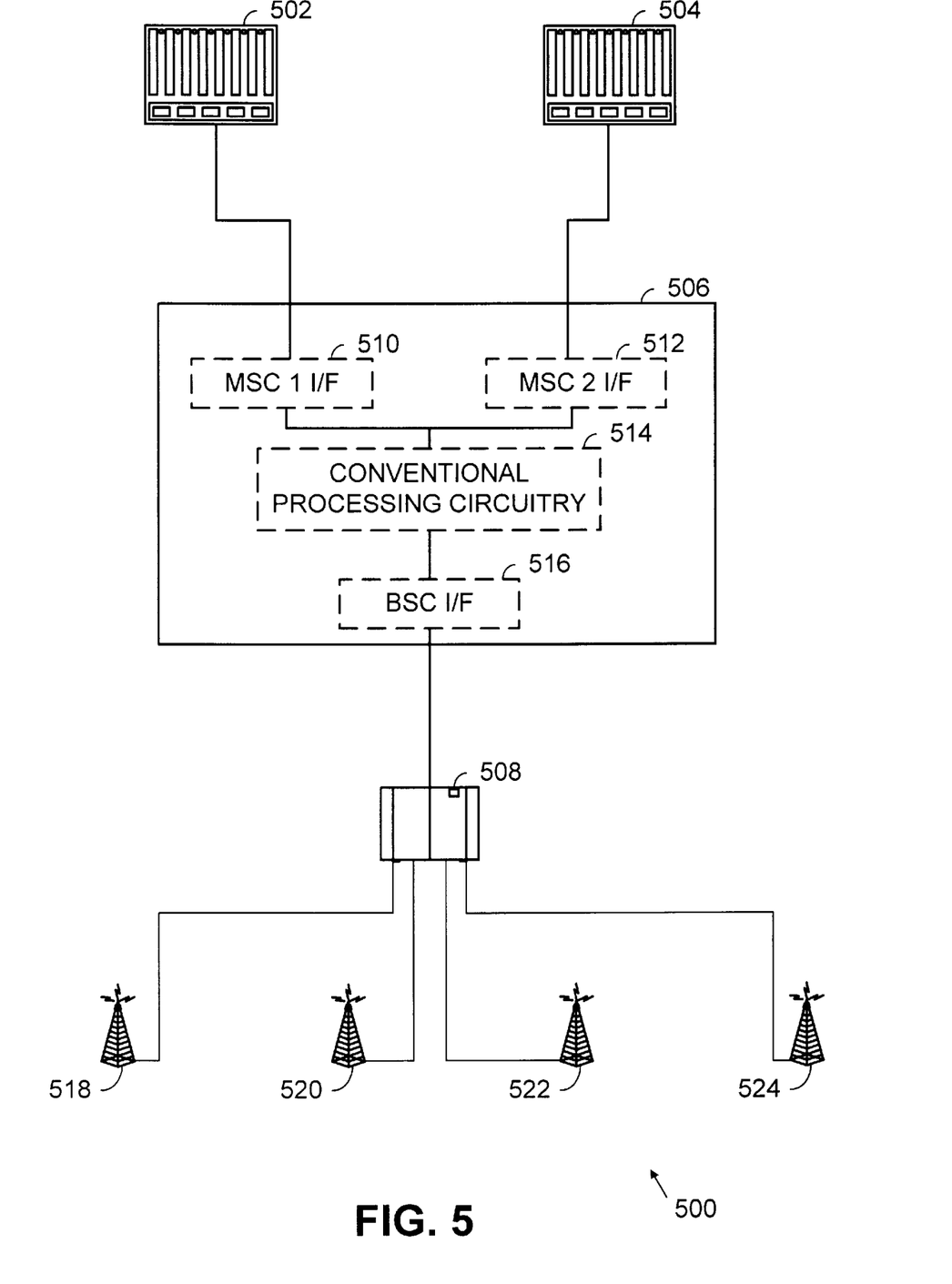
FIG. 5 is a diagram illustrating construction of a switch employed to route load from a base station controller to multiple mobile switching centers.

FIG. 5 illustrates a wireless communication system 500 in which switching is performed by a switch 506 residing external to a BSC 508 to route load between the BSC 508 and MSCs 502 and 504. As shown, BSC 508 couples to a plurality of BTSs 518, 520, 522 and 524. Further, the BSC 508 couples to MSCs 502 and 504 via the switch 506. The switch 506 includes a plurality of components that perform the switching operations between the BSC 508 and the MSCs 502 and 504.

The switch 506 includes an MSC 1 interface 510 that couples the switch 506 to MSC 502. The switch 506 also includes an MSC 2 interface 512 that couples the switch 506 to MSC 506. The switch 506 further includes a BSC interface 516 that couples the switch to the BSC 508. Moreover, the switch 506 includes conventional processing circuitry 514 that causes the switch 506 to perform dynamic load distribution according to the present invention. The conventional processing circuitry 514 is programmed to perform the switching operations according to the present invention, such switching operations not only monitoring loading and time of day but in controlling the MSC interfaces 510 and 512 and the BSC interface 516.

Figure 6:
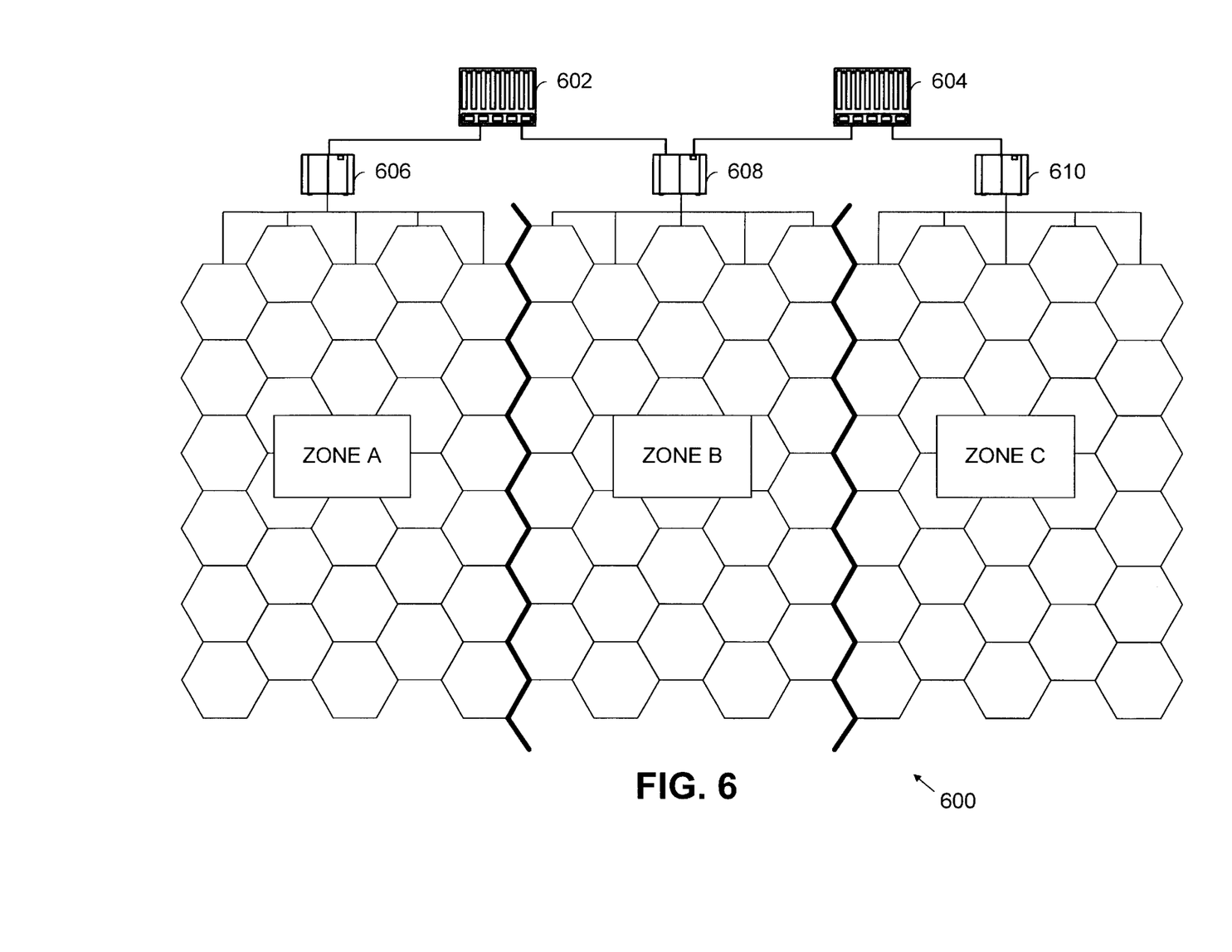
FIG. 6 is a diagram illustrating a portion of a service area in a wireless communication system operated according to the present invention.

FIG. 6 illustrates a portion 600 of a wireless communication system constructed according to the present invention. The wireless communication system is served by MSCs 602 and 604. MSC 602 couples to BSCs 606 and 608 while MSC 604 couples to BSCs 608 and 610. A plurality of cells serviced by the BTSs are shown as hexagons in FIG. 6. As shown, the BTS cells are divided into zone A, zone B and zone C. BSC 606 serves zone A, BSC 608 serves zone B and BSC 610 serves zone C. Thus, coverage is segregated along definite lines within the wireless communication system 600.

BSC 606 connects only to MSC 602 and BSC 610 connects only to MSC 604. However, BSC 608 couples to both MSC 602 and MSC 604. Thus, based upon operations consistent with the present invention, BSC 608 is serviced either by MSC 602 or MSC 604 in order to distribute loading between the MSCs 602 and 604. In a typical operation, the loading will be distributed based upon the capacity of the MSCs 602 and 604 and the projected loading within zone A, zone B, and zone C. For example, it may be known that zone A is heavily loaded during a first period of a day, that zone C is heavily loaded during a second period of the day, and zone B is moderately loaded during all times. Thus, according to the present invention, the BSC 608 serving zone B and the BSC 610 serving zone C will be serviced by MSC 604 by MSC 604 during the first period. Further, BSC 608 and BSC 606 will be served by MSC 602 during the second period. Because loading is typically known prior to actual occurrence of loading, BSC 608 may be programmed to switch between MSC 602 and MSC 604 at certain times during the day.

In another operation of the wireless communication system 600, load in zone B is serviced at all times by both MSCs 602 and 604. Load is routed from BSC 608 to the MSCs 602 and 604 based upon the available capacity of each of the MSCs 602 and 604. Thus, dynamic loading is performed during all time periods to equalize the load on MSCs 602 and 604 by selectively routing the load from zone B.

Figure 7:
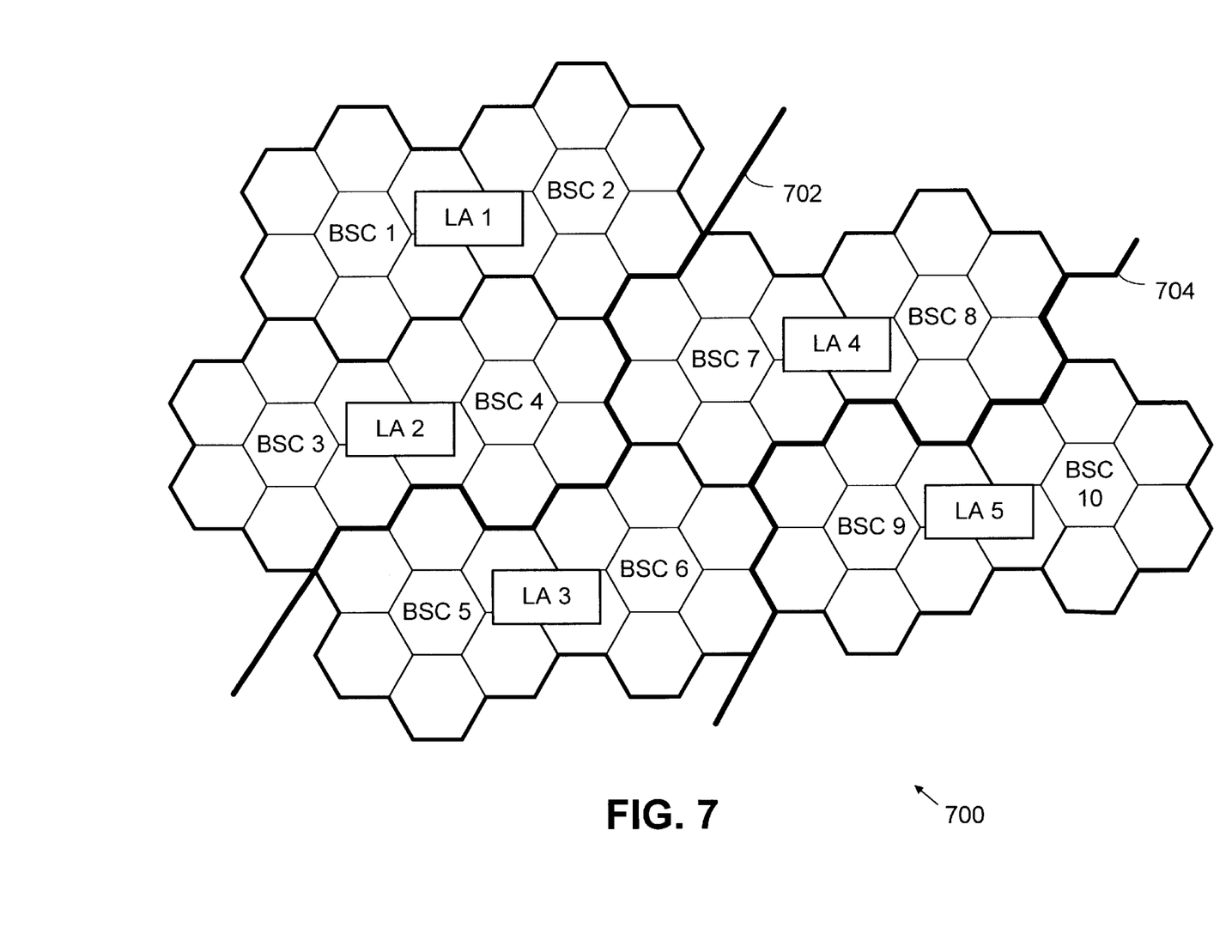
FIG. 7 is a diagram showing a portion of a wireless communication system service area divided according to the present invention.

FIG. 7 illustrates a segment of a wireless communication system 700 in which BSCs serve load areas that have been created by grouping cells that are served by a single BSC. BSC 1 and BSC 2 serve load area 1, BSC 3 and BSC 4 serve load area 2, BSCs 5 and 6 serve load area 3, BSCs 7 and 8 serve load area 4, and BSCs 9 and 10 serve load area 5. Dividing line 702 establishes a boundary between load areas 3 and 4 and load areas 1 and 2 while dividing line 704 establishes a boundary between load areas 3 and 4 and load area 5.

The boundaries of load areas are selected based upon the particular load patterns for the cells within the cellular wireless communication system. Cells are grouped together into the load areas in an attempt to equalize loading on the BSCs and to provide sufficient capacity to service the load within each load area. Typically, load areas include geographically proximate cells, such geographic grouping reducing the overhead associated with handoffs between cells served by a common load area. However, according to the present invention, load areas may include cells that are not geographically proximate to one another but that have similar loading patterns such that it makes sense to serve the cells with a particular BSC.

According to the present invention, the load areas are served by different MSCs, the selection of which depends upon loading conditions. For example, load areas 1 and 2 may be served together with load areas 3 and 4 by a first MSC during a first period. However, during a second time period, load areas 3 and 4 area are served together with load area 5 during a second period. By simulating system conditions and by recording historical system conditions, the operator of a system may fine tune the system so as to distribute loading on MSCs as evenly as possible to provide maximum system performance. In doing so, the system operator will establish load areas as illustrated in FIG. 7 to manage the load in an optimum fashion.

Figure 8:
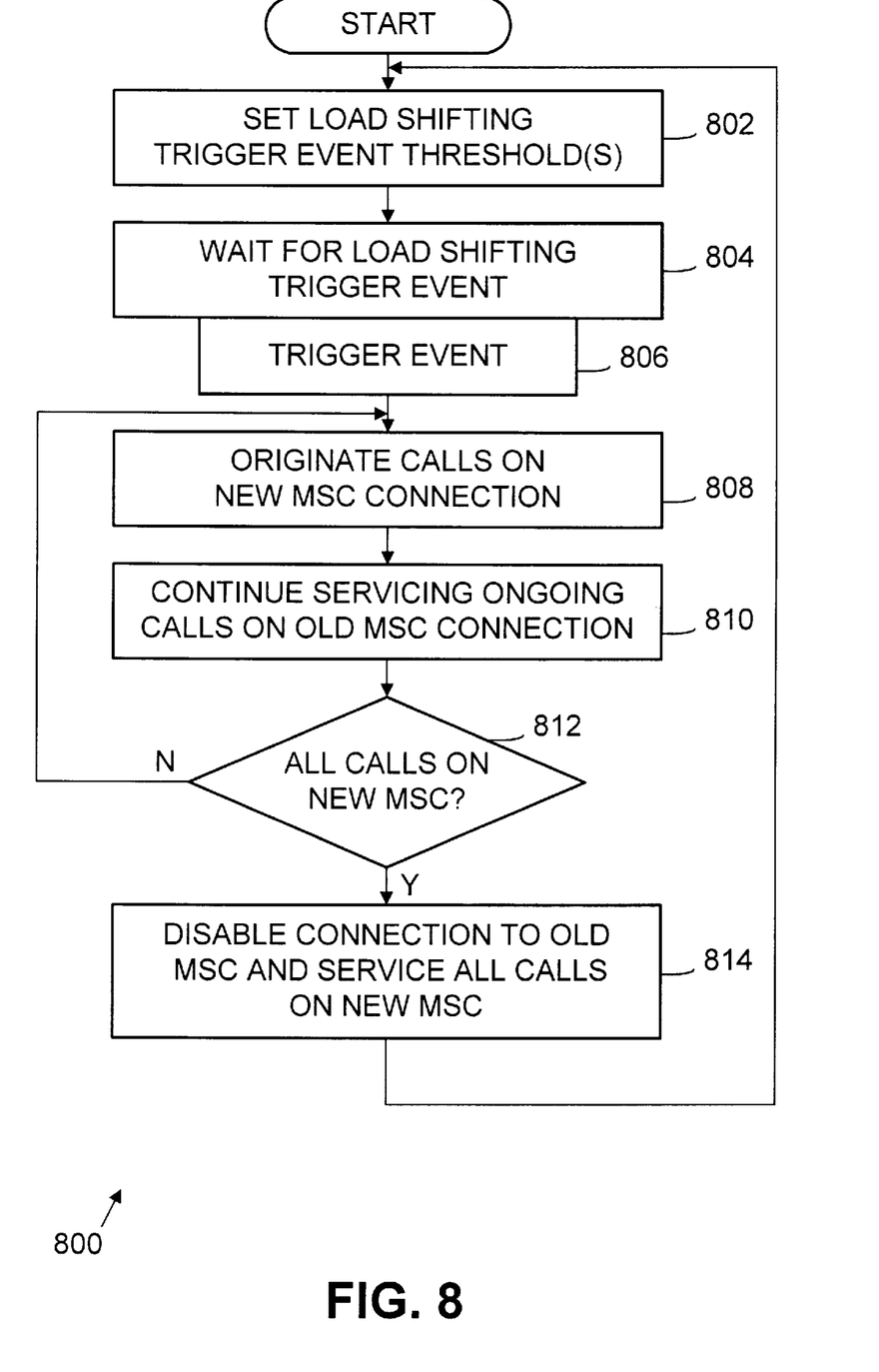
FIG. 8 is a logic diagram illustrating operation according to the present invention.

FIG. 8 illustrates operation of a wireless communication system constructed according to the present invention. The operation 800 assumes that one or more BSCs may be served by differing MSCs based upon system loading or upon other criterion such as time of day, day of week, week of month, and month of year. Operation commences at step 802 wherein the load shifting trigger event thresholds are set. As has been previously described, load shifting trigger event thresholds may be set at particular times of day, on particular days of the week or upon actual loading levels of the BSC, MSC or other measures of system loading.

For example, load may be substantially predictable during the day so that load shifting is generally performed on a time schedule. In such operations, a threshold is selected that is a time stamp and is compared to the time of day. When the time stamp is exceeded, switching operations are performed. However, when load shifts suddenly aside from the time of day load variations, switching is required to avoid exceeding component capacities. Thus, the threshold may also be set with respect to one or more loading thresholds. Load may then be shifted based actual system conditions that exceed the trigger event thresholds.

From step 802 operation proceeds to step 804 wherein the system waits for a load shifting trigger event. When the load shifting trigger event is met at step 806, operation proceeds to step 808 where the BSC servicing the load to be shifted will begins switching load to a new serving MSC from an old serving MSC. Such switching may be performed within the BSC or be performed external to the BSC, depending upon the particular construction considered. In initiating the load shifting, calls that are currently being serviced by the old serving MSC must not be terminated by the load shifting operations. During a switch over period, the BSC continues to route existing calls to the old serving MSC but originates new calls on the new serving MSC at step 808. Further, the BSC continues to service ongoing calls on the old MSC connection at step 810. From step 810 operation proceeds to step 812 where it is determined whether all calls are being serviced by the new serving MSC. If not, operation returns to step 808 and new calls continue to be originated to the new MSC while ongoing communications will be serviced via the old MSC.

However, at step 812, when it is determined that all calls are being serviced by the new MSC, operation proceeds to step 814 wherein the connection to the old MSC is disabled and all calls are now serviced on the new MSC. Then, from step 814, operation proceeds again to step 802 wherein new load shifting trigger event thresholds are set and the operation will continue.

In another embodiment of the operation, instead of continuing to service ongoing calls on the old serving MSC, ongoing calls are reswitched immediately to the new serving MSC. Such switching must be performed in cooperation between the BSC, the new serving MSC and the old serving MSC. These switching operations may be performed using dynamic switching techniques that are generally known.

Figure 9A:
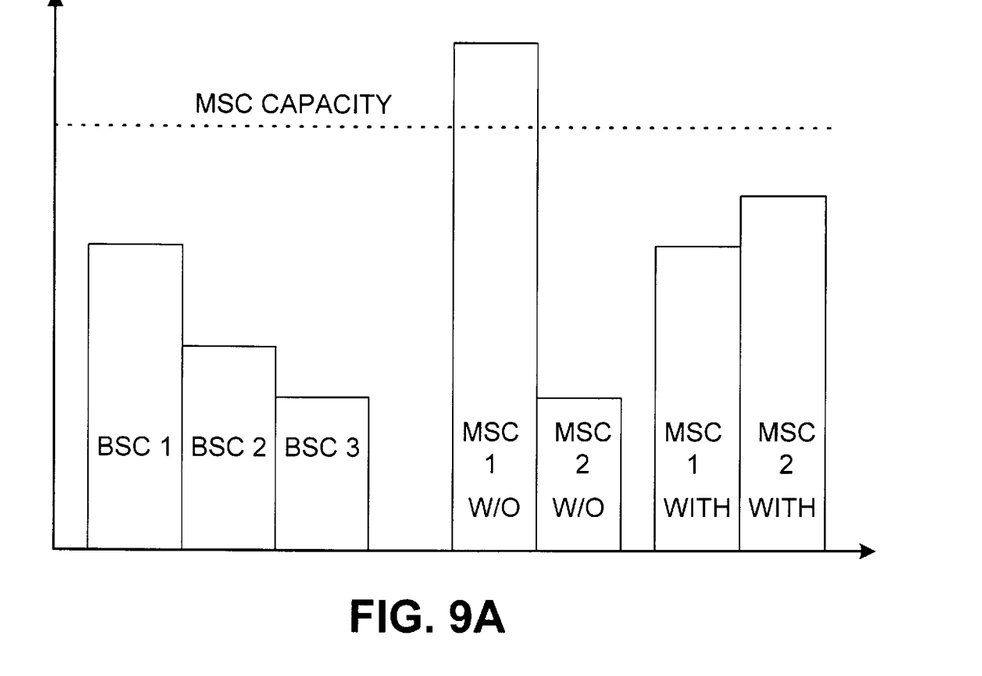
FIGS. 9A and 9B are charts illustrating loading of base station controllers and mobile switching centers within a wireless communication system according to the present invention.
Figure 9B:
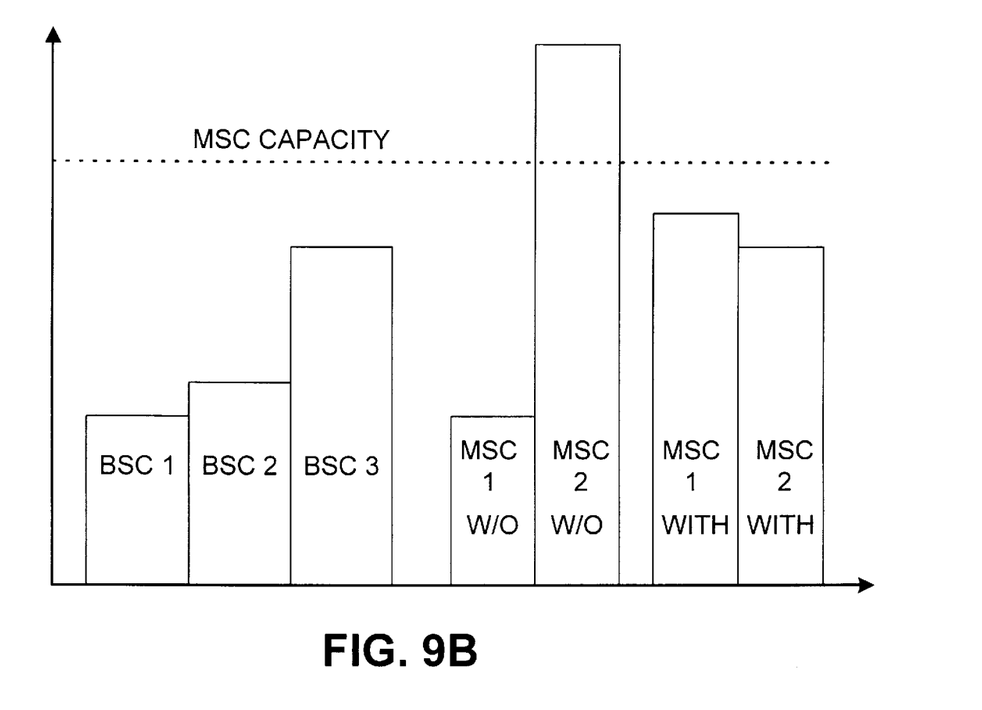

FIGS. 9A and 9B illustrate loading on BSCs and MSCs during specific time periods with and without application of the principles of the present invention. FIG. 9A illustrates loading on BSC 1, 2 and 3 at a particular point in time. Assuming that BSC 1 and BSC 2 are both served by MSC 1, and that BSC 3 is served by MSC 2, it is shown that without load balancing, MSC 1 (as indicated by MSC 1 W/O and MSC 2 W/O) is overloaded, its required load exceeding the MSC capacity. Resultantly, calls that would otherwise be served are blocked and calls that are being served may be dropped due to the overloading. However, with the load balancing principles of the present invention applied (as indicated by MSC 1 WITH and MSC 2 WITH), MSC 1 and MSC 2 both operate below the MSC capacity and all calls are serviced.

Referring now to FIG. 9B, it is shown that at a different time, BSC 3 is more heavily loaded than either BSC 1 or BSC 2. In such case, if BSC 1 and BSC 2 were served by MSC 1, the system would not be loaded as compared to the same configuration illustrated in FIG. 9A. However, if BSCs 1 and 3 are both served by MSC 2, then MSC 2 exceeds the MSC capacity and is overloaded blocked (as indicated by MSC 1 W/O and MSC 2 W/O). However, with the load balancing principles of the present invention applied, MSCs 1 and 2 each operate below the MSC capacities (as indicated by MSC 1 WITH and MSC 2 WITH).

In summary, assuming that FIGS. 9A and 9B represent loading on the various BSCs during different times of the day, if BSCs 1 and 2 were both coupled to MSC 1, the system would be overloaded at the time represented in FIG. 9A, but not in FIG. 9B. However, if BSCs 2 and 3 were both served by MSC 2, MSC 2 would not be overloaded at the time represented in FIG. 9A, but would be overloaded at the time represented in FIG. 9B. Thus, either configuration fails to adequately service the loading demands of the wireless communication system. However, the dynamic operations of the load balancing principle of the present invention when applied to the wireless communication system prevent such overloading.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A wireless communication system providing wireless service within a service area, the wireless communication system comprising:

a plurality of base stations, each of which supports wireless communications within a respective cell and services a load;

a base station controller coupled to the plurality of base stations;

a first mobile switching center;

a second mobile switching center;

a switch that couples the base station controller to both the first and second mobile switching centers; and the switch dynamically routing load between the base station controller and the first and second mobile switching centers in an effort to equalize load on the first and second mobile switching centers.

2. The wireless communication system of claim 1, wherein the switch routes the base station controller's load to the first mobile switching center during a first period and routes the base station controller's load to the second mobile switching center during a second period.

3. The wireless communication system of claim 2, wherein the first period and the second period correspond to differing time periods.

4. The wireless communication system of claim 1, wherein the switch and the base station controller share a housing.

5. The wireless communication system of claim 4, wherein the switch comprises:

a first mobile switching center interface that couples to the first mobile switching center;

a second mobile switching center interface that couples to the second mobile switching center;

a base station controller interface that couples to the base station controller; and processing circuitry coupled to the first mobile switching center interface, the second mobile switching center interface and the base station controller interface that routes load between the base station controller interface and the first mobile switching center interface and the second mobile switching center interface.

6. The wireless communication system of claim 1, wherein the switch comprises:

a first mobile switching center interface that couples the base station controller to a first mobile switching center of the plurality of base station controllers; and a second mobile switching center interface that couples the base station controller to a second mobile switching center of the plurality of base station controllers.

7. The wireless communication system of claim 6, wherein:

the first mobile switching center interface routes load served by the base station controller during a first period to the first mobile switching center; and the second mobile switching center interface routes load served by the base station controller during a second period to the second mobile switching center.

8. The wireless communication system of claim 1, further comprising a dedicated network coupling the base station controller to the first and second mobile switching centers.

9. The wireless communication system of claim 8, wherein load is dynamically routed from the plurality of base stations to the first and second mobile switching centers over the dedicated network to substantially equally load the first and second mobile switching centers.

10. The wireless communication system of claim 1, wherein routing of load between the base station controller and the first and second mobile switching centers is based upon the time of day.

11. The wireless communication system of claim 10, wherein routing of the load between the base station controller and the first and second mobile switching centers is based upon the day.

12. The wireless communication system of claim 1, wherein load from the base station controller is routed concurrently to both the first mobile switching center and the second mobile switching center when required.

13. The wireless communication system of claim 12, wherein a first amount of load routed to the first mobile switching center and a second amount of load routed to the second mobile switching center are determined based upon loading of at least one of the first mobile switching center and the second mobile switching center.

14. A method of operating a wireless communication system to equalize load among a plurality of mobile switching centers, the method comprising:

providing wireless service within a plurality of cells, each of the plurality of cells serviced by a respective base station of a plurality of base stations with each base station servicing a respective load;

routing load from each of the plurality of base stations to a corresponding base station controller; and dynamically routing load from the base station controller to both a first mobile switching center and a second mobile switching center via a switched connection in an effort to equalize loading on the first and second mobile switching centers.

15. The method of claim 14, wherein at least one base station controller of the plurality of base station controllers routes its load to a first mobile switching center of the plurality of mobile switching centers during a first period and routes its load to a second mobile switching center of the plurality of mobile switching centers during a second period.

16. The method of claim 15, wherein the first period and the second period correspond to differing time periods.

17. The method of claim 14, wherein a base station controller of the plurality of base station controllers couples to both a first mobile switching center and a second mobile switching center of the plurality of mobile switching centers via a switched connection.

18. The method of claim 17, further comprising:

routing load from the base station controller to the first mobile switching center during a first period; and routing load from the base station controller to the second mobile switching center during a second period.

19. The method of claim 14, further comprising routing load between a base station controller of the plurality of base station controllers and a first mobile switching center and a second mobile switching center of the plurality of mobile switching centers using switching equipment located within the base station controller.

20. The method of claim 14, further comprising routing load on a dedicated network that couples each of the plurality of base station controllers to each of the plurality of mobile switching centers.

21. The method of claim 20, wherein load is dynamically routed from the plurality of base stations to the plurality of mobile switching centers over the dedicated network to substantially equalize load among the plurality of mobile switching centers.

22. The method of claim 14, wherein routing of load between the plurality of base station controllers and the plurality of mobile switching centers is based upon the time of day.

23. The method of claim 22, wherein routing of the load between the plurality of base station controllers and the plurality of mobile switching centers is based upon the day.

24. The method of claim 14, wherein a base station controller of the plurality of base station controllers routes its load concurrently to both a first mobile switching center and a second mobile switching center of the plurality of mobile switching centers.

25. The method of claim 24, wherein a first amount of load routed to the first mobile switching center and a second amount of load routed to the second mobile switching center is based upon loading of at least one of the first mobile switching center and the second mobile switching center.

26. A computer readable medium that is readable by at least one component of a wireless communication system, the computer readable medium comprising:
- a first set of instructions that, when executed by the wireless communication system, cause the wireless communication system to provide wireless service within a plurality of cells, each of the plurality of cells serviced by a respective base station of a plurality of base stations with each base station servicing a respective load;
- a second set of instructions that, when executed by the wireless communication system, cause the wireless communication system to route the load from each of the plurality of base stations to a corresponding base station controller of a plurality of base station controllers; and
- a third set of instructions that, when executed by the wireless communication system, cause the wireless communication system to dynamically route load from at least one of the plurality of base station controllers to at least one of a plurality of mobile switching centers in an effort to equalize loading on the plurality of mobile switching centers.

27. The computer readable medium of claim 26, wherein at least one base station controller of the plurality of base station controllers routes its load to a first mobile switching center of the plurality of mobile switching centers during a first period and routes its load to a second mobile switching center of the plurality of mobile switching centers during a second period.

28. The computer readable medium of claim 27, wherein the first period and the second period correspond to differing time periods.

29. The computer readable medium of claim 26, wherein at least one base station controller of the plurality of base station controllers couples to both a first mobile switching center and a second mobile switching center of the plurality of mobile switching centers via a switched connection.

30. The computer readable medium of claim 29, further comprising:
- a fourth set of instructions that, when executed by the wireless communication system, cause the wireless communication system to route load from the at least one base station controller to the first mobile switching center during a first period; and
- a fifth set of instructions that, when executed by the wireless communication system, cause the wireless communication system to route load from the at least one base station controller to the second mobile switching center during a second period.

31. The computer readable medium of claim 26, further comprising a fourth set of instructions that, when executed by the wireless communication system, cause the wireless communication system to switch load of a base station controller of the plurality of base station controllers between a first mobile switching center and a second mobile switching center of the plurality of mobile switching centers using switching equipment located within the base station controller.

32. The computer readable medium of claim 26, further the step of routing load on a dedicated network coupling each of the plurality of base station controllers to each of the mobile switching centers.

33. The computer readable medium of claim 32, wherein load is dynamically routed from the plurality of base stations to the plurality of mobile switching centers over the dedicated network to substantially equalize load among the plurality of mobile switching centers.

34. The computer readable medium of claim 26, wherein routing of load between the plurality of base station controllers and the plurality of mobile switching centers is based upon the time of day.

35. The computer readable medium of claim 34, wherein routing of the load between the plurality of base station controllers and the plurality of mobile switching centers is based upon the day.

36. The computer readable medium of claim 26, wherein one base station controller of the plurality of base station controllers routes its load concurrently to both a first mobile switching center and a second mobile switching center of the plurality of mobile switching centers.

37. The computer readable medium of claim 36, wherein a first amount of load routed to the first mobile switching center and a second amount of load routed to the second mobile switching center is based upon loading of at least one of the first mobile switching center and the second mobile switching center.

* * * * *

UNITED STATES PATENT AND TRADEMARK OFFICE
CERTIFICATE OF CORRECTION

PATENT NO. : 6,129,604
DATED : October 10, 2000
INVENTOR(S) : Payam Maveddat, Will Egner and Wei Yuan It is certified that error appears in the above-identified patent and that said Letters Patent is hereby corrected as shown below:

Claims 17, 19, 20, 21, 22, 23, 24, 26, 27, 29, 30, 31, 33, 34, 35, and 36 should read as follows:

17. The method of claim 14, wherein the switched connection is accomplished by a switch that couples the base station controller to both the first mobile switching center and the second mobile switching center.

19. The method of claim 14, further comprising routing load between the base station contoller and the first mobile switching center and the second mobile switching center using switching equipment located within the base station controller.

20. The method of claim 14, further comprising routing load on a dedicated network that couples the base station controller to the first and second mobile switching centers.

21. The method of claim 20, wherein load is dynamically routed from the base station controller to the first and second mobile switching centers over the dedicated network to substantially equalize load among the plurality of mobile switching centers.

22. The method of claim 14, wherein routing ofload between the base station controller and the first and sencond mobile switching centers is based upon the time of the day.

23. The method of claim 22, wherein routing of the load between the base station controller and the first and second mobile switching centers is based upon the day.

24. The method of claim 14, wherein the base station routes its load concurrently to both the first mobile switching center and the second mobile switching center.

26. A Computer readable medium that is readable by at least one component of a wireles communication system, the computer readable medium comprising:
a first set of insructions that, when executed by the wireless communication system, cause the wireless communication system to provide wireless service within a plurality of cells, each of the plurality of cells serviced by a respective base station of a plurality of base stations with each base station servicing a respective load;
a second set of instructions that, when executed by the wireless communication system, cause the wireless communication system to route the load from each of the plurality of base stations to a corresponding base station controller;
a third set of instructions that, when executed by the wireless communication system, cause the wireless communication system to dynamically route load from the base

UNITED STATES PATENT AND TRADEMARK OFFICE
CERTIFICATE OF CORRECTION

PATENT NO. : 6,129,604
DATED : October 10, 2000
INVENTOR(S) : Payam Maveddat, Will Egner and Wei Yuan It is certified that error appears in the above-identified patent and that said Letters Patent is hereby corrected as shown below:

station controller to both a first mobile switching center and a second mobile switching center via a switched connection in an effort to equalize loading on the first and second mobile switching centers.

27. The computer readable medium of claim 26, wherein the base station controller routes its load to the first mobile switching center during a first period and routes its load to the second mobile switching center during a second period.

29. The computer readable medium of claim 26, wherein the switched connection is accomplished by a switch that couples the base station controller to both the first mobile switching center and the second mobile switching.

30. The computer readable medium of claim 29, further comprising:
a fourth set of instructions that, when executed by the wireless communication system, cause the wireless communication system to route load from the base station controller to the first mobile switching center during a first period; and
a fifth set of instructions that, when executed by the wireless communication system, cause the wireless communication system to route load from the base station controller to the second mobile switching center during a second period.

31. The computer readable medium of claim 26, further comprising a fourth set of instructions that, when executed by the wireless communication system, cause the wireless communication system to switch load of the base station controller between the first mobile switching center and the second mobile switching center using switching equipment located within the base station controller.

32. The computer readble medium of claim 26, wherein the load is routed on a dedicated network coupling the base station controller to each of the mobile switching centers.

33. The computer readable medium of claim 32, wherein load is dynamically routed from the base station controller to the first and second mobile switching center over the dedicated network to substantially equalize load among the mobile switching centers.

34. The computer readable medium of claim 26, wherein routing of load between the base station controller and the mobile switching centers is based upon the time of day.

35. The computer readable medium of claim 34, wherein routing of the load between the base station controller and the mobile switching centers is based upon the day.

UNITED STATES PATENT AND TRADEMARK OFFICE
CERTIFICATE OF CORRECTION

PATENT NO. : 6,129,604
DATED : October 10, 2000
INVENTOR(S) : Payam Maveddat, Will Egner and Wei Yuan It is certified that error appears in the above-identified patent and that said Letters Patent is hereby corrected as shown below:

36. The computer readable medium of claim 26, wherein the base station controller routes its load concurrently to both the first mobile switching center and the second mobile switching center.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*